United States Patent
Hernandez et al.

(10) Patent No.: US 10,953,810 B2
(45) Date of Patent: Mar. 23, 2021

(54) IMPACT BRACKET STRESS-DEFORMATION RELEASE MECHANISM

(71) Applicant: Safran Seats USA LLC, Gainesville, TX (US)

(72) Inventors: Juan Hernandez, Chihuahua (MX); Cinthya Caro, Chihuahua (MX); Suman Beeram, Prosper, TX (US); Ryan King, Fort Worth, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/256,411

(22) Filed: Jan. 24, 2019

(65) Prior Publication Data

US 2020/0139897 A1    May 7, 2020

Related U.S. Application Data

(60) Provisional application No. 62/754,288, filed on Nov. 1, 2018.

(51) Int. Cl.
| | |
|---|---|
| *B60N 2/42* | (2006.01) |
| *B64D 11/06* | (2006.01) |
| *B60R 11/02* | (2006.01) |
| *B64D 11/00* | (2006.01) |
| *B60R 11/00* | (2006.01) |
| *B60N 2/888* | (2018.01) |

(52) U.S. Cl.
CPC .... *B60R 11/0235* (2013.01); *B64D 11/00151* (2014.12); *B64D 11/0619* (2014.12); *B60N 2/888* (2018.02); *B60R 2011/008* (2013.01); *B60R 2011/0015* (2013.01)

(58) Field of Classification Search
CPC ..... B60R 2011/0015; B60R 2011/0017; B60R 2011/0082; B60R 2011/0235; B60R 2011/0258; B60R 2011/0252; B60R 2011/005; B64D 11/00151; B64D 11/00152; B64D 11/0619; B60N 2/888
USPC ........................................ 297/263.13, 216.14
See application file for complete search history.

(56) References Cited

U.S. PATENT DOCUMENTS

| | | | |
|---|---|---|---|
| 5,131,286 A * | 7/1992 | Sturges ................. | B62D 1/195 188/371 |
| 5,219,202 A | 6/1993 | Rink et al. | |
| 6,478,256 B1 * | 11/2002 | Williamson ......... | B64D 11/064 244/122 R |

(Continued)

OTHER PUBLICATIONS

Europe Patent Application No. 19203485.8, Extended European Search Report, dated Apr. 3, 2020.

*Primary Examiner* — Kyle J. Walraed-Sullivan
(74) *Attorney, Agent, or Firm* — Kilpatrick Townsend & Stockton LLP (57) ABSTRACT

Described are passenger seat assemblies having an impact bracket for a support pin. The support pin may be a component of a monitor assembly. The impact bracket includes a body that defines an aperture and a flex member within the aperture. The flex member defines a support region and a travelling region of the aperture. The flex member retains the support pin in the support region responsive to a load that is less than a minimum impact load, and releases the support pin from the support region into the travelling region responsive to a load that is at least the minimum impact load.

19 Claims, 4 Drawing Sheets

(56) References Cited

U.S. PATENT DOCUMENTS

| | | | | |
|---|---|---|---|---|
| 7,654,864 B2* | 2/2010 | Ishiguro | H05K 5/0204 | 248/548 |
| 7,876,551 B2* | 1/2011 | Wang | E05D 3/18 | 16/362 |
| 7,992,934 B2* | 8/2011 | Cailleteau | B60N 2/4214 | 297/216.14 |
| 9,487,157 B1 | 11/2016 | Vinton | | |
| 10,322,808 B2* | 6/2019 | Alamgir | B64D 11/06 | |
| 2004/0262974 A1* | 12/2004 | Terada | B60N 2/865 | 297/407 |
| 2005/0161988 A1* | 7/2005 | Minai | B60N 2/42763 | 297/216.1 |
| 2006/0226688 A1* | 10/2006 | Terada | B60N 2/888 | 297/391 |
| 2006/0279114 A1* | 12/2006 | Toda | B60N 2/862 | 297/216.12 |
| 2007/0075578 A1* | 4/2007 | Klukowski | B60N 2/888 | 297/391 |
| 2007/0085400 A1* | 4/2007 | Terada | B60N 2/888 | 297/391 |
| 2007/0241593 A1* | 10/2007 | Woerner | B60N 2/865 | 297/216.12 |
| 2007/0257528 A1* | 11/2007 | Akaike | B60N 2/002 | 297/216.12 |
| 2008/0100104 A1* | 5/2008 | Axelsson | B60N 2/42709 | 297/216.1 |
| 2008/0252113 A1* | 10/2008 | Alexander | B60N 2/832 | 297/216.12 |
| 2009/0001786 A1* | 1/2009 | Haglund | B60N 2/0232 | 297/216.14 |
| 2009/0008974 A1* | 1/2009 | Hattori | B60N 2/64 | 297/217.3 |
| 2009/0121526 A1* | 5/2009 | Akaike | B60N 2/002 | 297/216.12 |
| 2009/0243355 A1* | 10/2009 | Heeg | B60N 2/42763 | 297/216.12 |
| 2010/0176621 A1* | 7/2010 | Aufrere | B60N 2/015 | 296/68.1 |
| 2010/0194157 A1* | 8/2010 | Nitsuma | B60N 2/4228 | 297/216.1 |
| 2011/0233974 A1* | 9/2011 | Yamaguchi | B60N 2/0276 | 297/216.12 |
| 2012/0315027 A1* | 12/2012 | Schutz | B60R 11/04 | 396/419 |
| 2014/0070578 A1* | 3/2014 | Szelagowski | B60N 2/427 | 297/216.13 |
| 2016/0176357 A1* | 6/2016 | Maslakow | F16M 13/02 | 224/275 |
| 2016/0244086 A1* | 8/2016 | Moriyama | B62D 1/187 | |
| 2017/0028874 A1* | 2/2017 | Castaing | B60N 2/01 | |
| 2017/0028927 A1* | 2/2017 | Harris | B60N 2/882 | |
| 2017/0050602 A1* | 2/2017 | Vinton | B60N 2/809 | |
| 2017/0129413 A1* | 5/2017 | Yu | F16M 11/14 | |
| 2017/0144612 A1* | 5/2017 | Vinton | B60N 2/42 | |
| 2018/0050803 A1* | 2/2018 | Le | B64D 11/0647 | |
| 2019/0031352 A1* | 1/2019 | Pierson-Moonan | B64D 11/064 | |
| 2019/0225338 A1* | 7/2019 | Pozzi | B64D 11/00152 | |
| 2019/0232884 A1* | 8/2019 | Yamada | B60R 11/02 | |

* cited by examiner

IMPACT BRACKET STRESS-DEFORMATION RELEASE MECHANISM

CROSS REFERENCE TO RELATED APPLICATIONS

This application is related to and claims priority benefits from U.S. Provisional Application Ser. No. 62/754,288 ("the '288 application"), filed on Nov. 1, 2018, entitled "TILT ASSEMBLY STRESS-DEFORMATION RELEASE MECHANISM" The '288 application is hereby incorporated in its entirety by this reference.

FIELD OF THE INVENTION

The field of the invention relates to impact brackets, and, more particularly, to impact brackets that allow for separation of components responsive to an impact load.

BACKGROUND

Brackets may be used in a variety of applications and devices to support various objects. For example, an electronics monitor may be supported by a bracket on a passenger seat assembly of a passenger vehicle such as an aircraft, bus, car, train, etc. The bracket supporting the electronics monitor may optionally allow for the tilt angle of the monitor to be adjusted relative to a seat back of the passenger seat assembly. In traditional passenger seat assemblies, rigid brackets have been used to support the electronics monitor. Because the rigid bracket may potentially cause a fatality or severe injury to a passenger during a collision or other event where the passenger impacts the monitor, some passenger seat assemblies use nylon screws to connect the bracket to the seat back with the objective to break during a severe impact. However, nylon screws break during regular operation on the passenger seat assembly, which creates a field service issue and may compromise the certification of the seat with the bracket. As such, there still exists a need for brackets that can withstand regular operation while minimizing potential injury during an accident or other impact event.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat assembly includes a monitor assembly having a support pin. The passenger seat assembly also includes an impact bracket having a body that defines an aperture and a flex member within the aperture. The flex member defines a support region of the aperture and a travelling region of the aperture. The flex member is adapted to retain the support pin in the support region responsive to a load that is less than a minimum impact load and release the support pin from the support region into the travelling region responsive to a load that is at least the minimum impact load.

In some embodiments, the flex member is configured to maintain a lateral position of the support pin in the support region responsive to the load that is less than the minimum impact load, and the support pin is pivotable within the support region. In various embodiments, the flex member is configured to flex in an upward direction responsive to the load that is at least the minimum impact load such that the support pin is released from the support region into the travelling region. In certain embodiments, the passenger seat assembly includes a seat back, and the impact bracket is supported on the seat back.

In various embodiments, the support region includes a circular profile and the travelling region includes an elongated profile. In certain embodiments, the monitor assembly includes a tilting pin, the impact bracket defines a tilting aperture, and the tilting pin is movable within the tilting aperture such that the monitor assembly is tiltable relative to the impact bracket. In some embodiments, the minimum impact load is 200 lbs.

According to certain embodiments of the present invention a passenger seat assembly includes a seat back and an impact bracket supported on the seat back. The impact bracket includes a body that defines an aperture and a flex member within the aperture. The flex member defines a support region of the aperture and a travelling region of the aperture. The flex member is adapted to retain a support pin in the support region responsive to a load that is less than a minimum impact load and release the support pin from the support region into the travelling region responsive to a load that is at least the minimum impact load.

In some embodiments, the passenger seat assembly includes a monitor assembly having a monitor and the support pin. In various embodiments, the support pin is a first support pin at a first side of the monitor, the monitor assembly includes a second support pin at a second side of the monitor opposite from the first side, the impact bracket is a first impact bracket, and the passenger seat assembly includes a second impact bracket. In some embodiments, the second impact bracket includes a body defining an aperture and a flex member within the aperture, the flex member of the second impact bracket defines a support region of the aperture and a travelling region of the aperture, and the flex member of the second impact bracket is adapted to retain the support pin in the support region of the second impact bracket responsive to the load that is less than the minimum impact load and release the second support pin from the support region into the travelling region of the second impact bracket responsive to the load that is at least the minimum impact load.

In various embodiments, the impact bracket defines a tilting aperture that is configured to receive a tilting pin such that the tilting pin is movable within the tilting aperture. In certain embodiments, the support region includes a circular profile and the travelling region includes an elongated profile. In some embodiments, the flex member is configured to maintain a lateral position of the support pin in the support region responsive to the load that is less than the minimum impact load. The flex member may be configured to flex in an upward direction responsive to the load that is at least the minimum impact load and guide the support pin in a downward direction responsive to the load that is at least the minimum impact load.

According to certain embodiments of the present invention, an impact bracket for a passenger seat assembly includes a body defining an aperture and a flex member positioned within the aperture. The flex member defines a support region of the aperture and a travelling region of the aperture. The flex member is adapted to laterally maintain a support pin of a monitor assembly in the support region responsive to a load that is less than a minimum impact load and release the support pin from the support region into the travelling region responsive to a load that is at least the minimum impact load.

In some embodiments, the body defines a tilting aperture, and the tilting aperture is adapted to receive a tilting pin of the monitor assembly. In certain embodiments, the support region includes a circular profile and wherein the travelling region includes an elongated profile. In various embodiments, the flex member is configured to flex in an upward direction responsive to the load that is at least the minimum impact load. In certain embodiments, the flex member is configured to guide the support pin in a downward direction responsive to the load that is at least the minimum impact load. In some embodiments, the minimum impact load is 200 lbs.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide an impact bracket. The impact bracket is discussed for use with aircraft seats, but it is by no means so limited. Rather, embodiments of the impact bracket may be used in passenger seats, other seats of any type, in other environments that require selective disengagement of components, or otherwise as desired.

According to certain embodiments of the present invention and as shown in FIGS. 1-6, an impact bracket 100 includes a body 102 that defines a support aperture 104 that accommodates a support pin. In the example of FIGS. 1-6, the support aperture 104 is illustrated supporting a support pin 108 of a monitor assembly 106 such that a monitor 110 of the monitor assembly 106 is supported by the impact bracket 100. However, the disclosure of the monitor assembly 106 and/or the monitor 110 should not be considered limiting on the current disclosure, as in other examples, the support aperture 104 may accommodate support pins of various other devices.

In some cases, the body 102 may optionally also define a tilting aperture 112 that accommodates a tilting pin of a tilt assembly. In the example of FIG. 106, the tilting aperture 112 is illustrated supporting a tilting pin 114 of the monitor assembly 106 such that the monitor 110 can be tilted relative to the impact bracket 100 to change a viewing angle of the monitor 110. The size, shape, and location of the tilting aperture 112 should not be considered limiting on the current disclosure. In certain examples, the tilting aperture 112 may be omitted from the impact bracket 100. Moreover, in other examples, the body 102 may optionally define various other apertures as desired. For example, the body 102 may include apertures that accommodate screws or bolts for mounting the impact bracket 100 on a frame of a passenger seat.

Figure 1:
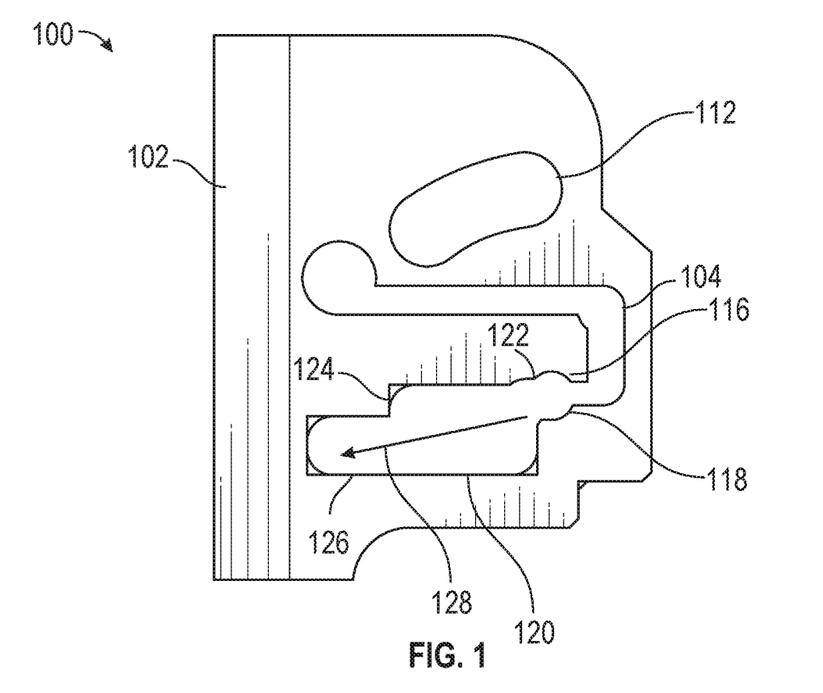
FIG. 1 is a side view of an impact bracket according to certain embodiments of the present invention.
Figure 2:
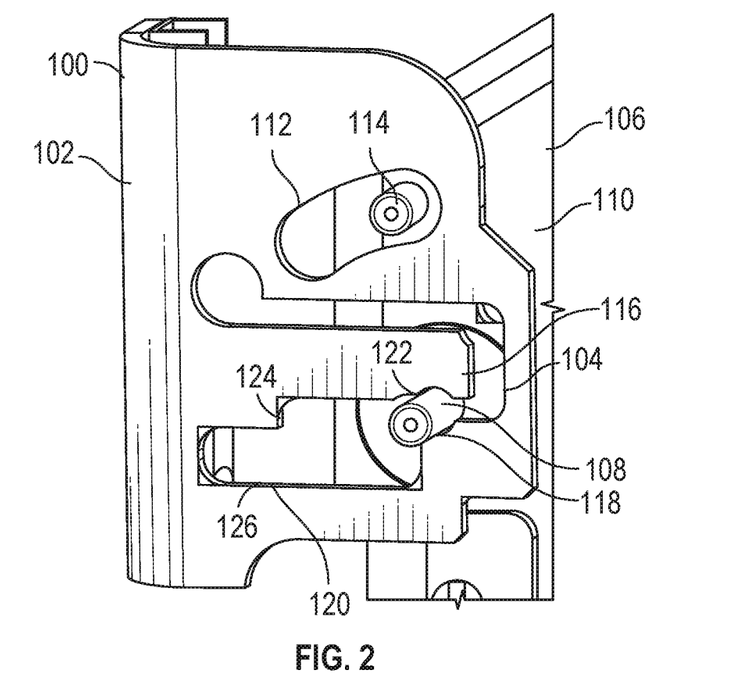
FIG. 2 is a perspective view of the impact bracket of FIG. 1 supporting a monitor assembly.

As best illustrated in FIGS. 1 and 2, the body 102 of the impact bracket 100 defines a flex member 116 within the support aperture 104. The flex member 116 can selectively flex or move within the support aperture 104 depending on a load that is applied to the support pin 108 as discussed below. The flex member 116 defines a support region 118 of the support aperture 104 and a travelling region 120 of the support aperture 104. The support region 118 is in communication with the travelling region 120 such that the support pin 108 can selectively move between the regions ding on a load that is applied to the support pin 108 as discussed below.

The support region 118 of the support aperture 104 has a profile that is complimentary to a shape of the support pin 108 such that a vertical and horizontal position of the support pin 108 is maintained relative to the impact bracket 100 under regular operating conditions. As used herein, a regular operating condition refers to a load that is less than the minimum impact load. The minimum impact load is the minimum load that may be applied to the support pin during an impact event (e.g., a collision, accident, etc.). In some examples, the minimum impact load is 200 lbs.; however, in other examples, the minimum impact load may be less than 200 lbs. or greater than 200 lbs. In the example of FIGS. 1-6, the support region 118 has a circular profile and is adapted to support the circular support pin 108; however, in other examples, the support region 118 may have various other suitable profiles as desired.

In some examples, the profile of the support aperture 104 includes a positioning rib 122 that may at least partially retain the support pin 108 within the support region 118 in regular operating conditions. In the example of FIGS. 1-6, the positioning rib 122 is on the flex member 116; however, in other examples, the positioning rib 122 may be provided on the body 102. Optionally, the positioning rib 122 and profile of the support region 118 may allow for rotation of the support pin 108 within the support region 118 while maintaining the vertical and horizontal position of the support pin 108.

As mentioned, the travelling region 120 is in communication with the support region 118 such that the support pin 108 can be selectively released from the support region 118 and into the travelling region 120. In certain examples, and as discussed below, the support pin 108 may be released from the support region 118 and into the travelling region responsive to a load that is applied to the support pin 108 that is at least the minimum impact load.

Compared to the support region 118, the travelling region 120 has a profile that enables horizontal and/or vertical movement of the support pin 108 within the travelling region 120. In the example of FIGS. 1-6, the profile of the travelling region 120 is elongated and has an upper portion 124 and a lower portion 126. Through the upper portion 124 and the lower portion 126, the travelling region 120 may guide the support pin 108 within the travelling region 120 and along a travel path 128 to maximize the travel time and travel distance of the support pin 108 within the travelling region 120. In certain aspects, maximizing the travel time and/or travel distance within the travelling region 120 may minimize or reduce Head Injury Criterion (HIC) values for the impact bracket 100 and/or the assembly (e.g., monitor assembly) supported by the bracket 100, thereby reducing the risk of a fatality or severe injury during an impact event. In various aspects, the profile of the travelling region 120 has a geometry that minimizes obstacles for the support pin 108 to further facilitate movement within the travelling region 120. In the example of FIGS. 1-6, the profile of the travelling region 120 has rounded corners to minimize obstacles, although various other features to facilitate movement may be utilized.

In the example of FIGS. 1-6, the travel path 128 extends downwardly and away from the support region 118. However, the shape of the travelling region 120 and/or the travel path 128 should not be considered limiting on the current disclosure, as the travelling region 120 and/or travel path 128 may have different profiles or directions as desired. For example, in some cases, the travelling region 120 may have a different profile that omits the upper portion 124 and lower portion 126 while still having a travel path 128 that extends downwardly and away from the support region 118. As another example, in other cases, the travelling region 120 may have a different profile such that the travel path 128 extends parallel to the support region 118, upwardly and away from the support region 118, etc.

The impact bracket 100 may be constructed from various suitable materials including, but not limited to, aluminum, stainless steel, aramid fibers, polycarbonate, polypropylene, plastics, other metallic materials, composite materials, or other similar materials, combinations thereof, or various other suitable materials for supporting a pin and allowing selective disengagement of the pin as discussed in detail below. In various examples, the impact bracket 100 may be formed through various suitable manufacturing techniques including, but not limited to, a turret punch press, a laser cutter, a water jet, a stamping press, injection molding, additive manufacturing, combinations thereof, or various other suitable mechanisms.

Figure 3:
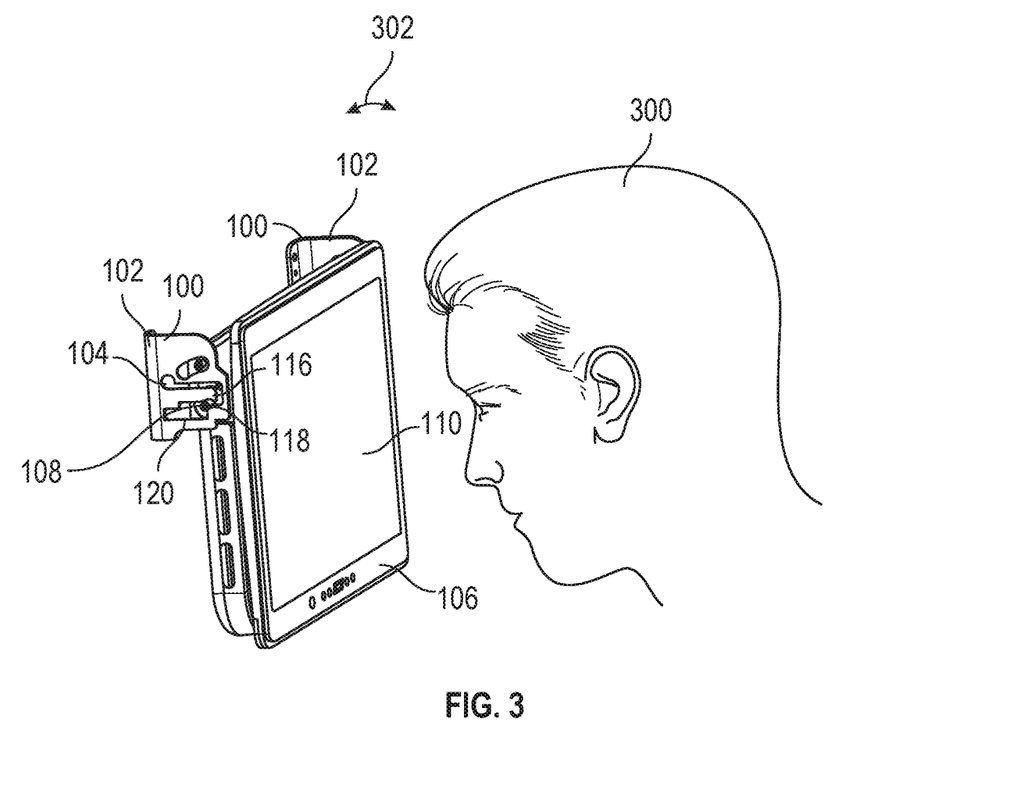
FIG. 3 is a perspective view of the impact bracket and the monitor assembly of FIG. 2 during regular operation.

FIG. 3 illustrates two impact brackets 100 supporting the monitor assembly 106 such that a passenger 300 can view the monitor 110. In the example of FIG. 3, the monitor assembly 106 includes two support pins 108, each supported by one of the impact brackets 100. However, the number of impact brackets 100 and/or support pins 108 should not be considered limiting on the current disclosure. In FIG. 3, the support pins 108 are shown under regular operating conditions where the load on each support pin 108 is less than the minimum impact load. As illustrated in FIG. 3, in some examples under regular operating conditions, the passenger 300 is able to tilt the monitor 110 to various viewing angles (see arrow 302) while the support pins 108 are maintained within the support region 118 of each impact bracket 100.

Figure 4:
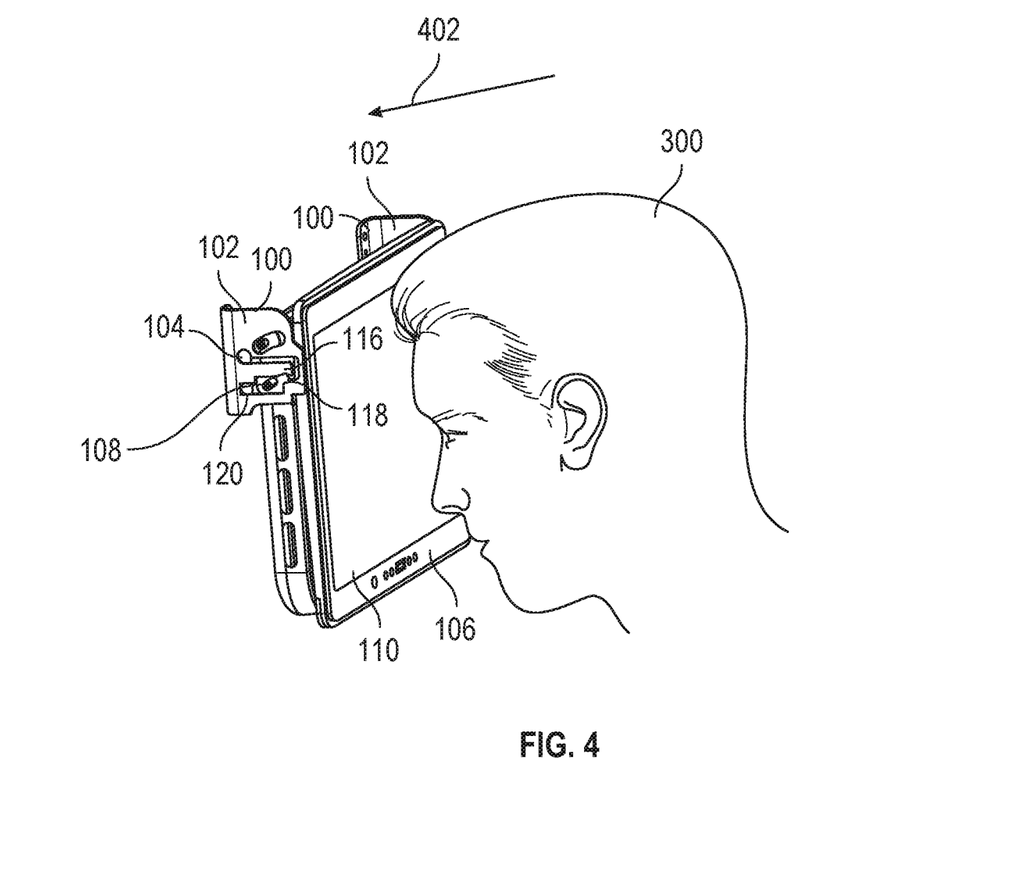
FIG. 4 is a perspective view of the impact bracket and the monitor assembly of FIG. 2 during an impact event.
Figure 5:
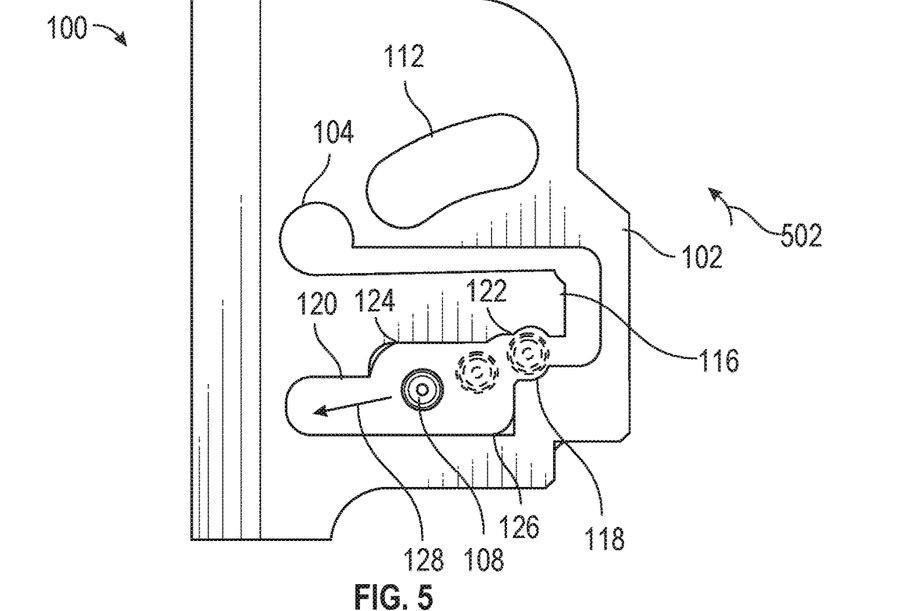
FIG. 5 is another side view of the impact bracket of FIG. 1 illustrating movement of a support pin.

FIG. 4 illustrates the two impact brackets 100 and monitor assembly 106 during an impact event, which may occur during a crash, collision, accident, or various other scenarios. During the impact event, the passenger 300 may impact the monitor 110 (see arrow 402), which can result in a load that is applied to each support pin 108 that is at least the minimum impact load. As mentioned previously, in certain cases, the minimum impact load is 200 lbs., although in other examples, the minimum impact load may be less than 200 lbs. or greater than 200 lbs. As represented by arrow 502 in FIG. 5, the minimum impact load on each support pin 108 may cause the flex member 116 to flex or move within the support aperture 104. Flexing or movement of the flex member 116 may allow for the support pin 108 to move from the support region 118 to the travelling region 120 and within the travelling region 120 at least partially along the travel path 128. As mentioned, in some cases, because the support pin 108 can move from the support region 118 to the travelling region 120 and subsequently travel within the travelling region 120 for a maximum time and maximum distance in response to the minimum impact load, the energy from the minimum impact load is more dissipated and the HIC values are decreased. The reduction in HIC values decreases the possibility of a fatality or a severe injury during the impact event. In certain examples, the impact bracket 100 provides HIC values that are in compliance with 14 CFR 25.785.

Figure 6:
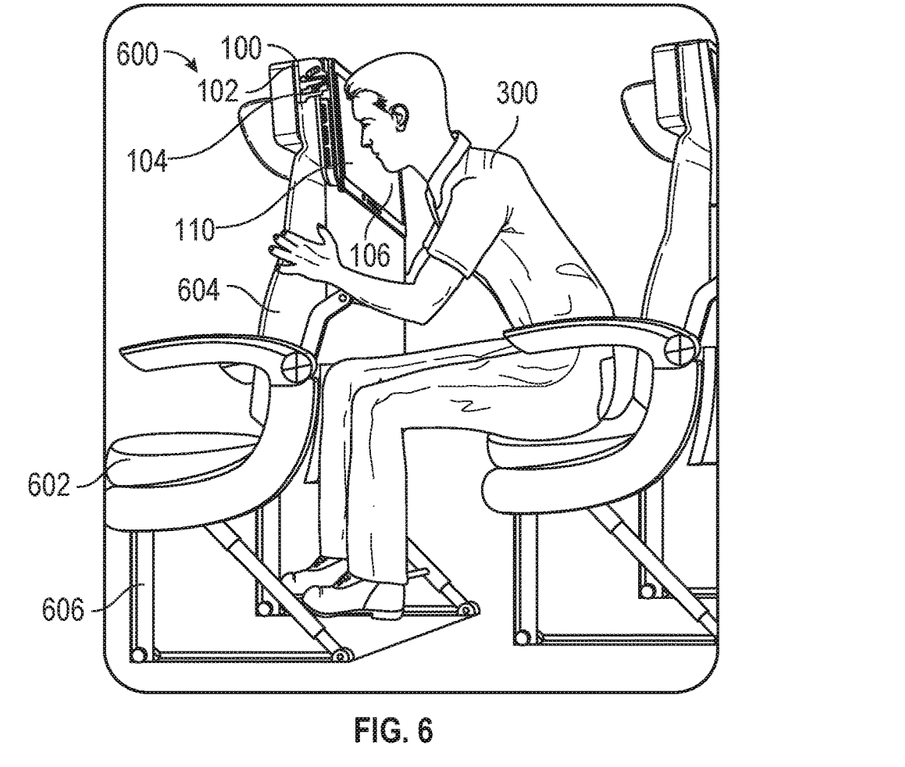
FIG. 6 is a perspective view of a passenger seat assembly with the impact bracket of FIG. 1 supporting the monitor assembly.

FIG. 6 illustrates the two impact brackets 100 and monitor assembly 106 supported on a passenger seat assembly 600. As illustrated in FIG. 6, the passenger seat assembly 600 generally includes a seat base 602, a seat back 604, and a leg assembly 606. Various other components such as armrests, luggage bars, tray tables, etc. may be provided with the passenger seat assembly 600 as desired. In the example of FIG. 6, the impact brackets 100 are connected to the seat back 604 through various suitable fasteners to support the monitor assembly 106 on the seat back 604. Various suitable fasteners include but are not limited to screws, bolts, rivets or other mechanical or chemical fasteners. In other examples, the impact brackets 100 may be connected various other components of the passenger seat assembly 600. In certain cases, the location of the impact brackets 100 on the passenger seat assembly 600 may depend on the component supported by the impact brackets 100. In the example of FIG. 6, the passenger 300 is shown during an impact event where the passenger 300 has impacted the monitor 110.

A collection of exemplary examples providing additional description of a variety of example types in accordance with the concepts described herein are provided below. These examples are not meant to be mutually exclusive, exhaustive, or restrictive; and the invention is not limited to these example examples but rather encompasses all possible modifications and variations within the scope of the issued claims and their equivalents.

Example 1

A passenger seat assembly comprising: a monitor assembly comprising a support pin; and an impact bracket comprising a body defining an aperture and a flex member within the aperture, wherein the flex member defines a support region of the aperture and a travelling region of the aperture, and wherein the flex member is adapted to retain the support pin in the support region responsive to a load that is less than a minimum impact load and release the support pin from the support region into the travelling region responsive to a load that is at least the minimum impact load.

Example 2

The passenger seat assembly of any of the preceding or subsequent examples, wherein the flex member is configured to maintain a lateral position of the support pin in the support region responsive to the load that is less than the minimum impact load, and wherein the support pin is pivotable within the support region.

Example 3

The passenger seat assembly of any of the preceding or subsequent examples, wherein the flex member is configured to flex in an upward direction responsive to the load that is at least the minimum impact load such that the support pin is released from the support region into the travelling region.

Example 4

The passenger seat assembly of any of the preceding or subsequent examples, further comprising a seat back, wherein the impact bracket is supported on the seat back.

Example 5

The passenger seat assembly of any of the preceding or subsequent examples, wherein the support region comprises a circular profile and wherein the travelling region comprises an elongated profile.

Example 6

The passenger seat assembly of any of the preceding or subsequent examples, wherein the monitor assembly further comprises a tilting pin, wherein the impact bracket further defines a tilting aperture, and wherein the tilting pin is movable within the tilting aperture such that the monitor assembly is tiltable relative to the impact bracket.

Example 7

The passenger seat assembly of any of the preceding or subsequent examples, wherein the minimum impact load is 200 lbs.

Example 8

A passenger seat assembly comprising: a seat back; and an impact bracket supported on the seat back, wherein the impact bracket comprises a body defining an aperture and a flex member within the aperture, wherein the flex member defines a support region of the aperture and a travelling region of the aperture, and wherein the flex member is adapted to retain a support pin in the support region responsive to a load that is less than a minimum impact load and release the support pin from the support region into the travelling region responsive to a load that is at least the minimum impact load.

Example 9

The passenger seat assembly of any of the preceding or subsequent examples, further comprising a monitor assembly comprising a monitor and the support pin.

Example 10

The passenger seat assembly of any of the preceding or subsequent examples, wherein the support pin is a first support pin at a first side of the monitor, wherein the monitor assembly further comprises a second support pin at a second side of the monitor opposite from the first side, wherein the impact bracket is a first impact bracket, wherein the passenger seat assembly further comprises a second impact bracket, the second impact bracket comprising: a body defining an aperture and a flex member within the aperture, wherein the flex member of the second impact bracket defines a support region of the aperture and a travelling region of the aperture, and wherein the flex member of the second impact bracket is adapted to retain the support pin in the support region of the second impact bracket responsive to the load that is less than the minimum impact load and release the second support pin from the support region into the travelling region of the second impact bracket responsive to the load that is at least the minimum impact load.

Example 11

The passenger seat assembly of any of the preceding or subsequent examples, wherein the impact bracket further defines a tilting aperture, and wherein the tilting aperture is configured to receive a tilting pin such that the tilting pin is movable within the tilting aperture.

Example 12

The passenger seat assembly of any of the preceding or subsequent examples, wherein the support region comprises a circular profile and wherein the travelling region comprises an elongated profile.

Example 13

The passenger seat assembly of any of the preceding or subsequent examples, wherein the flex member is configured to maintain a lateral position of the support pin in the support region responsive to the load that is less than the minimum impact load.

Example 14

The passenger seat assembly of any of the preceding or subsequent examples, wherein the flex member is configured to flex in an upward direction responsive to the load that is at least the minimum impact load and guide the support pin in a downward direction responsive to the load that is at least the minimum impact load.

Example 15

An impact bracket for a passenger seat assembly, the impact bracket comprising: a body defining an aperture; and a flex member positioned within the aperture, wherein the flex member defines a support region of the aperture and a travelling region of the aperture, and wherein the flex member is adapted to laterally maintain a support pin of a monitor assembly in the support region responsive to a load that is less than a minimum impact load and release the support pin from the support region into the travelling region responsive to a load that is at least the minimum impact load.

Example 16

The impact bracket of any of the preceding or subsequent examples, wherein the body further defines a tilting aperture, wherein the tilting aperture is adapted to receive a tilting pin of the monitor assembly.

Example 17

The impact bracket of any of the preceding or subsequent examples, wherein the support region comprises a circular profile and wherein the travelling region comprises an elongated profile.

Example 18

The impact bracket of any of the preceding or subsequent examples, wherein the flex member is configured to flex in an upward direction responsive to the load that is at least the minimum impact load.

Example 19

The impact bracket of any of the preceding or subsequent examples, wherein the flex member is configured to guide the support pin in a downward direction responsive to the load that is at least the minimum impact load.

Example 20

The impact bracket of any of the preceding or subsequent examples, wherein the minimum impact load is 200 lbs.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat assembly comprising:
a monitor assembly comprising a support pin; and
an impact bracket comprising a body defining an aperture and a flex member within the aperture, wherein the flex member defines an upper end of a support region of the aperture and an upper end of a travelling region of the aperture, wherein the support region is disposed at a non-zero angle with respect to the travelling region, and wherein the flex member is adapted to retain the support pin in the support region responsive to a load that is less than a minimum impact load and release the support pin from the support region into the travelling region responsive to a load that is at least the minimum impact load.

2. The passenger seat assembly of claim 1, wherein the flex member is configured to maintain a lateral position of the support pin in the support region responsive to the load that is less than the minimum impact load, and wherein the support pin is pivotable within the support region.

3. The passenger seat assembly of claim 1, wherein the flex member is configured to flex in an upward direction responsive to the load that is at least the minimum impact load such that the support pin is released from the support region into the travelling region.

4. The passenger seat assembly of claim 1, further comprising a seat back, wherein the impact bracket is supported on the seat back.

5. The passenger seat assembly of claim 1, wherein the support region comprises a circular profile and wherein the travelling region comprises an elongated profile.

6. The passenger seat assembly of claim 1, wherein the monitor assembly further comprises a tilting pin, wherein the impact bracket further defines a tilting aperture, and wherein the tilting pin is movable within the tilting aperture such that the monitor assembly is tiltable relative to the impact bracket.

7. The passenger seat assembly of claim 1, wherein the minimum impact load is 200 lbs.

8. A passenger seat assembly comprising:
a seat back; and
an impact bracket supported on the seat back, wherein the impact bracket comprises a body defining an aperture and a flex member within the aperture,
wherein the flex member defines an upper end of a support region of the aperture and an upper end of a travelling region of the aperture,
wherein the support region is comprises a support aperture having a profile that is complimentary of a support pin; and
wherein the flex member is adapted to retain the support pin within the support aperture of the support region responsive to a load that is less than a minimum impact load and release the support pin from the support region into the travelling region responsive to a load that is at least the minimum impact load, and
a monitor assembly comprising a monitor and the support pin.

9. The passenger seat assembly of claim 8, wherein the support pin is a first support pin at a first side of the monitor, wherein the monitor assembly further comprises a second support pin at a second side of the monitor opposite from the first side, wherein the impact bracket is a first impact bracket, wherein the passenger seat assembly further comprises a second impact bracket, the second impact bracket comprising:
a body defining an aperture and a flex member within the aperture,
wherein the flex member of the second impact bracket defines an upper end of a support region of the aperture and an upper end of a travelling region of the aperture, and
wherein the flex member of the second impact bracket is adapted to retain the support pin in the support region of the second impact bracket responsive to the load that is less than the minimum impact load and release the second support pin from the support region into the travelling region of the second impact bracket responsive to the load that is at least the minimum impact load.

10. The passenger seat assembly of claim 8, wherein the impact bracket further defines a tilting aperture, and wherein the tilting aperture is configured to receive a tilting pin such that the tilting pin is movable within the tilting aperture.

11. The passenger seat assembly of claim 8, wherein the support region comprises a circular profile and wherein the travelling region comprises an elongated profile.

12. The passenger seat assembly of claim 8, wherein the flex member is configured to maintain a lateral position of the support pin in the support region responsive to the load that is less than the minimum impact load.

13. The passenger seat assembly of claim 8, wherein the flex member is configured to flex in an upward direction responsive to the load that is at least the minimum impact load and guide the support pin in a downward direction responsive to the load that is at least the minimum impact load.

14. An impact bracket for a passenger seat assembly, the impact bracket comprising:
  a body defining an aperture; and
  a flex member positioned within the aperture, wherein the flex member defines an upper end of a support region of the aperture and an upper end of a travelling region of the aperture, wherein the support region is disposed at a non-zero angle with respect to the travelling region, wherein the support region comprises a support aperture having a profile that is complimentary of a support pin, and wherein the flex member laterally maintains the support pin of a monitor assembly in the support aperture of the support region responsive to a load that is less than a minimum impact load and is configured to release the support pin from the support region into the travelling region responsive to a load that is at least the minimum impact load.

15. The impact bracket of claim 14, wherein the body further defines a tilting aperture, wherein the tilting aperture is adapted to receive a tilting pin of the monitor assembly.

16. The impact bracket of claim 14, wherein the support region comprises a circular profile and wherein the travelling region comprises an elongated profile.

17. The impact bracket of claim 14, wherein the flex member is configured to flex in an upward direction responsive to the load that is at least the minimum impact load.

18. The impact bracket of claim 17, wherein the flex member is configured to guide the support pin in a downward direction responsive to the load that is at least the minimum impact load.

19. The impact bracket of claim 14, wherein the minimum impact load is 200 lbs.

* * * * *